United States Patent
Kirihata et al.

(10) Patent No.: US 7,146,471 B2
(45) Date of Patent: Dec. 5, 2006

(54) SYSTEM AND METHOD FOR VARIABLE ARRAY ARCHITECTURE FOR MEMORIES

(75) Inventors: Toshiaki Kirihata, Poughkeepsie, NY (US); Gerhard Mueller, Munich (DE); Wing K. Luk, Chappaqua, NY (US)

(73) Assignees: International Business Machines Corp., Armonk, NY (US); Infineon Technologies AG, Munich (DE)

( * ) Notice: Subject to any disclaimer, the term of this patent is extended or adjusted under 35 U.S.C. 154(b) by 261 days.

(21) Appl. No.: 10/748,333

(22) Filed: Dec. 31, 2003

(65) Prior Publication Data
US 2005/0144373 A1 Jun. 30, 2005

(51) Int. Cl.
*G06F 12/02* (2006.01)

(52) U.S. Cl. ...................... 711/154; 711/167

(58) Field of Classification Search ............ 716/2, 716/4, 5, 8, 13, 18; 326/80, 93; 365/230; 711/154, 167
See application file for complete search history.

(56) References Cited

U.S. PATENT DOCUMENTS

| | | | |
|---|---|---|---|
| 5,541,850 A * | 7/1996 | Vander Zanden et al. .... | 716/18 |
| 5,926,396 A * | 7/1999 | Ohara ........................... | 716/4 |
| 5,978,573 A * | 11/1999 | Ohara ........................... | 716/8 |
| 6,205,571 B1 * | 3/2001 | Camporese et al. ........... | 716/2 |
| 6,205,572 B1 * | 3/2001 | Dupenloup ..................... | 716/5 |
| 6,324,678 B1 * | 11/2001 | Dangelo et al. .............. | 716/18 |
| 6,421,294 B1 * | 7/2002 | Hidaka ................... | 365/230.03 |
| 6,457,166 B1 * | 9/2002 | Shoyama ...................... | 716/18 |
| RE38,152 E * | 6/2003 | Ohara .......................... | 326/80 |
| 6,904,585 B1 * | 6/2005 | Brittain et al. ................ | 716/13 |
| 2001/0019512 A1* | 9/2001 | Hidaka ................... | 365/230.03 |
| 2003/0001621 A1* | 1/2003 | Kim et al. .................... | 326/93 |

OTHER PUBLICATIONS

L. Benini, L. Macchiarulo, A. Macii, E. Macci, M. Poncino, "From Architecture to Layout: Partitioned Memory Synthesis for Embedded Systems-on-Chip", Jun. 2001, ACM, pp. 784-789.*

* cited by examiner

*Primary Examiner*—Pierre Bataille
*Assistant Examiner*—Paul Schlie
(74) *Attorney, Agent, or Firm*—Edell, Shapiro & Finnan, LLC

(57) ABSTRACT

A memory system that employs simultaneous activation of at least two dissimilar memory arrays, during a data manipulation, such as read or write operations is disclosed. An exemplary embodiment includes a memory system containing a plurality of arrays, each in communication with a common controller, wherein the arrays are activated by different supply voltage (Vdd). When a processor sends a command to retrieve or write data to the memory system, two or more arrays are addressed to supply the required data. By proper partitioning of the data between dissimilar arrays, the efficiency of data reading is improved.

9 Claims, 14 Drawing Sheets

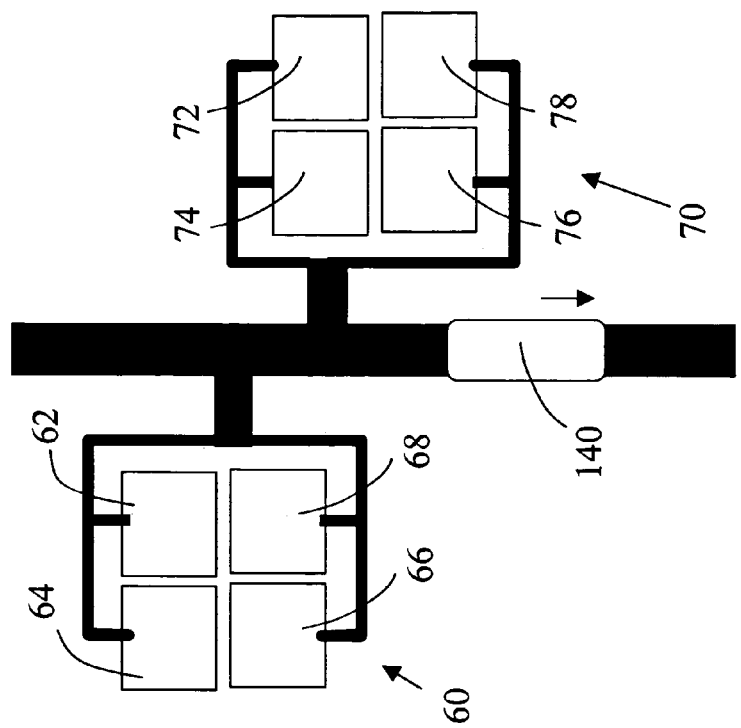
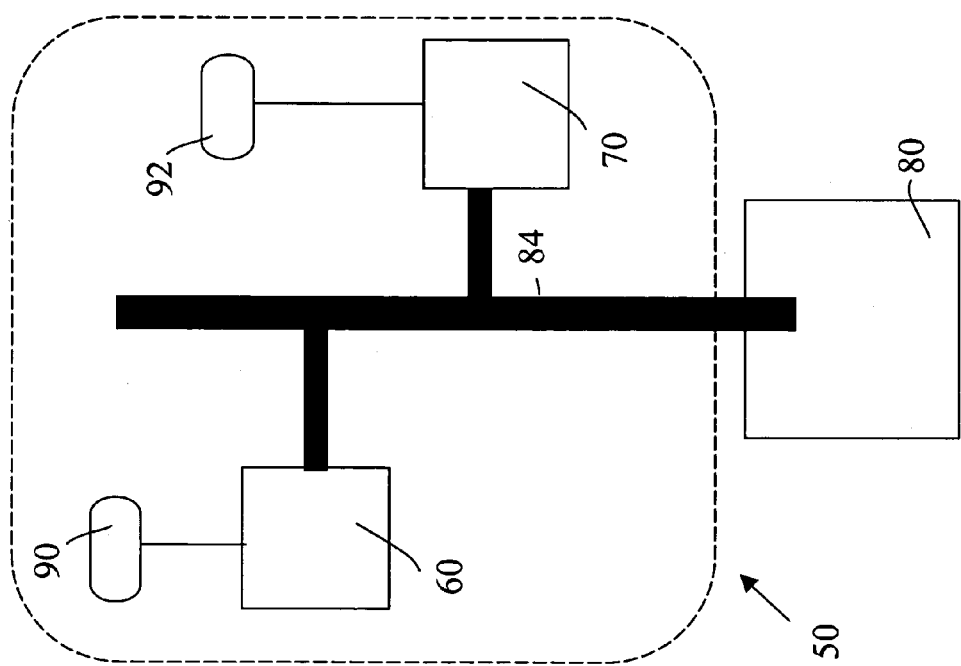
Figure 2(b)
Figure 2(a)

SYSTEM AND METHOD FOR VARIABLE ARRAY ARCHITECTURE FOR MEMORIES

BACKGROUND

1. Field of the Invention

The present invention relates generally to memory circuits in integrated circuits. More particularly, the present invention relates to systems and methods for improving dynamic random access memory (DRAM) by employing a variable array architecture.

2. Background

The semiconductor industry continues to be driven by the benefits imparted by miniaturization of integrated circuits that comprise commercial devices such as memory chips, controllers, and microprocessors. The ability to fabricate increasingly smaller devices and circuits affords the possibility of greater speed, higher device density, and cheaper cost for a given performance. However, these benefits may incur the potential cost of higher power consumption within a chip, as well as inefficient utilization of the full chip resources. In memory devices, both enhanced memory capacity and speed are desirable in order to increase overall system performance. In dynamic random access memory (DRAM) data is accessed and stored in rectangular or square arrays of memory "cells." Miniaturization has increased both the density and speed at which DRAM arrays operate, often at the expense of increased power consumption.

In prior art memory systems based on DRAM arrays, a typical memory consists of a group of memory arrays designed so that each array contains similar structure and function. The group of arrays may reside entirely on the same silicon chip, or be distributed on different silicon chips. FIGS. 1(a) and 1(b) illustrate a conventional memory system 2, comprising a plurality of memory arrays 4. Each memory array contains cells arranged in rows and columns so that each cell within an array has a unique address corresponding to the row and column that it occupies. A cell 5 is activated for reading by sending a signal along the address bus (not shown) to access a particular cell to be read. The cell data is output on memory data bus 8, which may be, for example, eight bits wide. When a byte of information is stored in system 2, a single bit 20 of the byte is stored in each of the eight arrays. Optionally, as is well known, two or more bits may be stored in each of the eight arrays to increase the bandwidth. The row and column address of the bit location within each array is the same. When a processor (not shown) requests the information contained in data byte 22, the data is read out by retrieving a plurality of bits 20, one from each array 4, as shown in FIG. 1(a). The data is then output along data bus 8 as byte 22, as illustrated in FIG. 1(b).

In the above example, each array within the system performs in an identical fashion to the other arrays. Control of the overall memory performance is determined in large part by the array design and operating voltage. The refresh rate and power consumption may be reduced by reducing the amount of rows in the array. However, for the same array size, this requires longer wordlines, which requires more cells to be activated during a read or write operation, since all of the cells in a given row must be accessed during such operations. This, in turn, leads to a longer latency period when a row is being activated. The operation speed of the memory system may be increased by increasing the supply voltage, but this results in greater power consumption. Thus, in conventional memory architecture, improvement of one memory feature often results in an adverse impact on another feature.

In light of the foregoing discussion, it will be appreciated that there exists a need to overcome the tradeoffs in power, performance, and speed that are inherent in prior art memory architecture.

SUMMARY OF THE INVENTION

The present invention relates to structures and architecture that improve memory devices. In particular, a design architecture is disclosed that employs simultaneous activation of at least two dissimilar arrays, during a read or write operation. An exemplary embodiment of the current invention includes a memory system containing a plurality of arrays, each in communication with a common controller, wherein the distinguishing feature between arrays is the supply voltage (Vdd). When a microprocessor sends a command to retrieve or write data to the memory system, two or more arrays are addressed to supply the required data. At least two arrays are powered by differing voltages. The faster array(s) (higher Vdd) operate to provide an initial portion of the data, while the array(s) powered by low Vdd, operating less rapidly, provide a complementary portion of the data subsequent to the initial portion. By using arrays of differing Vdd in combination, the requested data is provided in an efficient manner, in which the potential delayed response of the slower, low Vdd, arrays is masked. In an exemplary embodiment this is accomplished by arranging a shorter signal path between the slower array(s) and a memory controller, such that the first group of requested data from the faster, high Vdd, arrays and the second group of data from the low Vdd arrays arrives at the memory controller at about the same time. The overall power consumption of the operation is reduced from what would be required if the data were all resident in high Vdd arrays, without slowing down the operation time, since only the last-required data is retrieved from the slow array(s).

Another embodiment of the current invention includes a memory system containing a plurality of arrays, wherein the wordline length differs among at least two of the arrays. In an exemplary embodiment, a system comprises a first array that employs a short wordline architecture, with additional support circuitry supporting a fast access time, and a second array that employs a long wordline architecture. During access operations, an initial group of data is retrieved from the short wordline array, while a subsequent group of data is retrieved from the longer wordline arrays. The slower response time of the longer wordline arrays is masked by placing the longer wordline arrays such that the signal path is shorter to a memory controller than the signal path for the faster, short wordline arrays. At the same time, the area needed for additional support circuitry that is required by the short wordline arrays is reduced, by use of at least one long wordline array, which requires limited support circuitry.

Another embodiment of the current invention comprises a memory system containing a plurality of arrays, wherein the bitline sensing scheme for data output differs among at least two of the arrays. An exemplary embodiment includes a first array employing a Vdd sensing scheme and a second array employing a ground sensing scheme. During a data retrieval event in the memory system, the overall speed of data retrieval is improved by partitioning the data output between the Vdd sense array and the ground sense array.

A further embodiment of the present invention comprises a memory system including a plurality of arrays, wherein the bitline length differs among at least two of the arrays.

DESCRIPTION OF THE DRAWINGS

FIGS. 2(a) and (b) depict a memory system according to an embodiment of the present invention, comprising arrays of differing Vdd.

DETAILED DESCRIPTION OF THE INVENTION

Figure 1B:
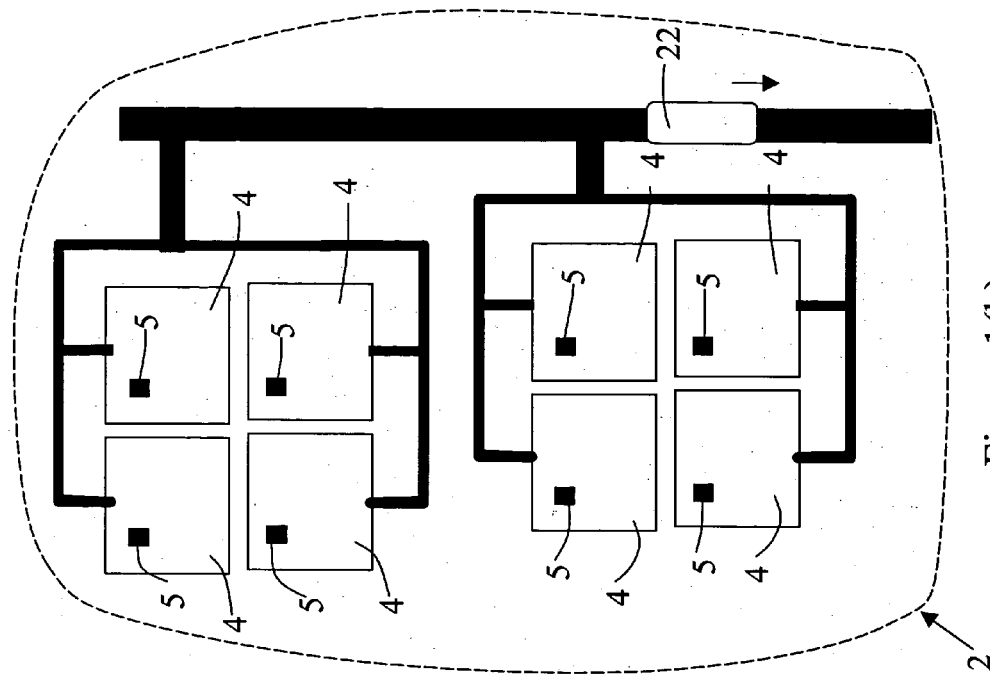
FIGS. 1(a) and (b) depict a memory system according to prior art.
Figure 1A:
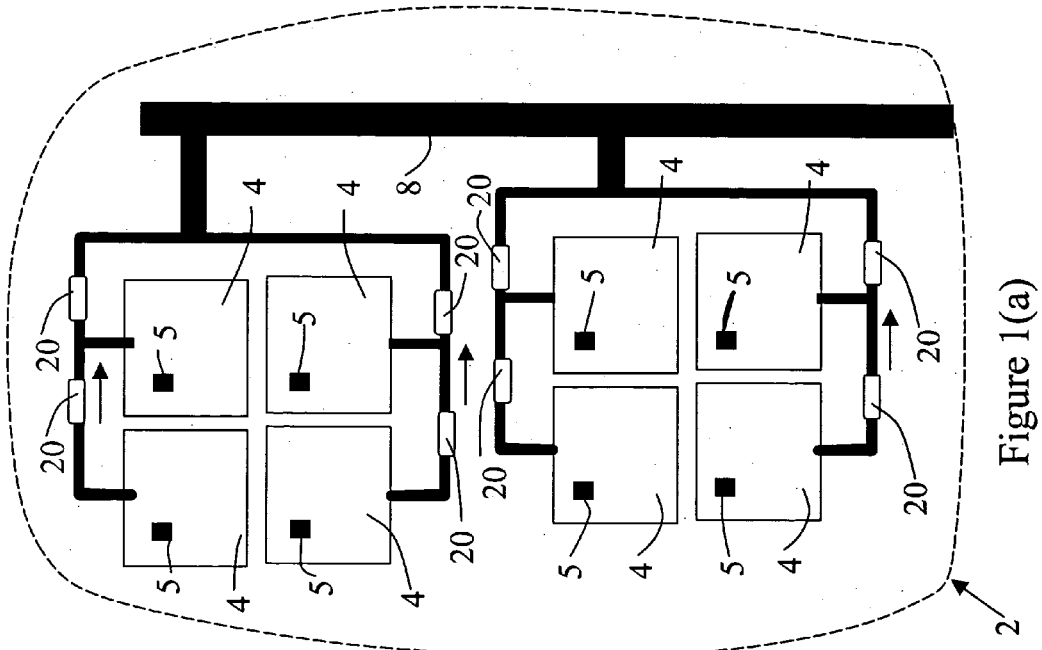

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. For instance, although embodiments disclosed below describe data read operations, embodiments including data write operations are anticipated. In addition, although embodiments refer to manipulation of bits and bytes of data, embodiments employing units of data of a large range of sizes are anticipated. Also, it is to be understood that the phraseology and terminology used herein is for the purpose of description and should not be regarded as limiting.

FIG. 2(a) illustrates a memory system 50, arranged according to an exemplary embodiment of the present invention. A first array 60, and a second array 70 are each electrically connected to memory controller 80, through data bus 84. Array 60 is connected to a voltage source 90 operating at a first voltage V1, while array 70 is connected to a second voltage source 92 operating at V2, where the value of V2 is less than the value of V1. In a preferred embodiment, the signal path (hereafter also referred to as "data path") from array 60 to the memory controller 80 is longer than that from array 70 to the memory controller 70. In an exemplary embodiment, array 60 comprises sub-arrays 62, 64, 66, and 68; and array 70 comprises sub-arrays 72, 74, 76, and 78, as illustrated in FIG. 2(b).

Figure 3:
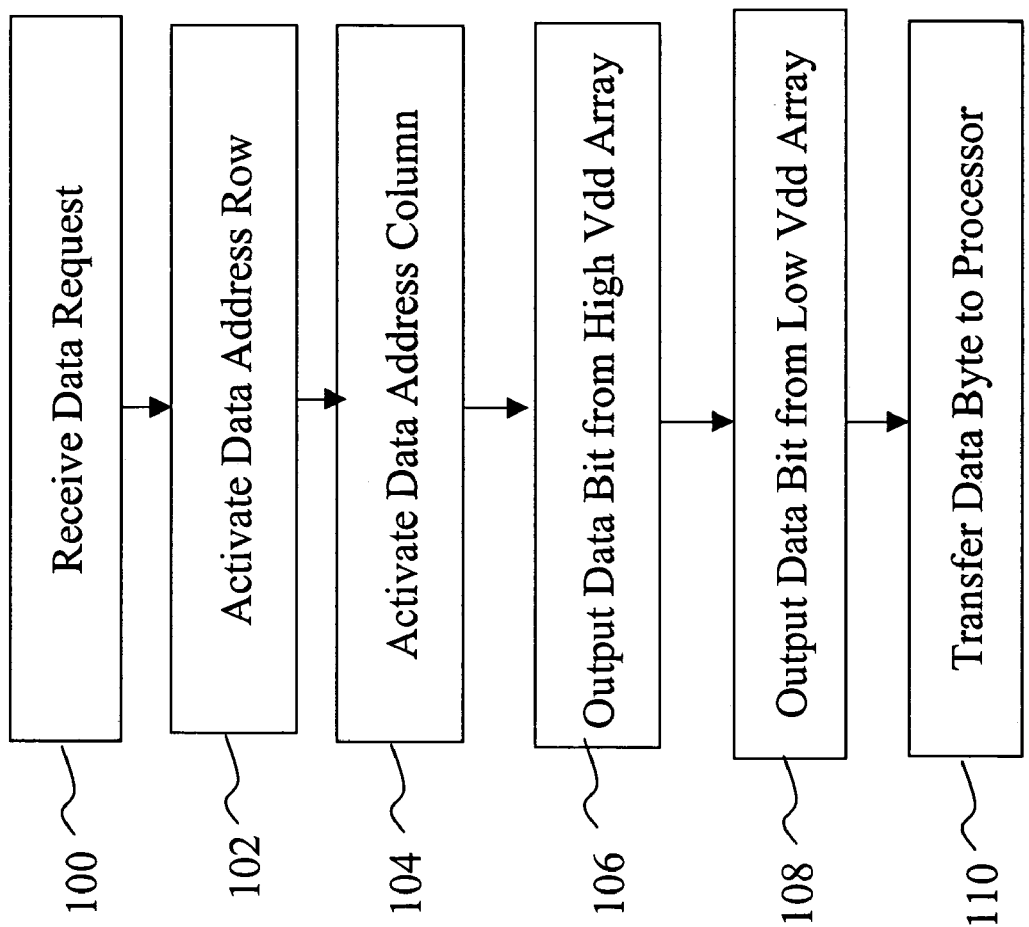
FIG. 3 depicts the steps comprising a data read operation according to an exemplary embodiment of the present invention.
Figure 4B:
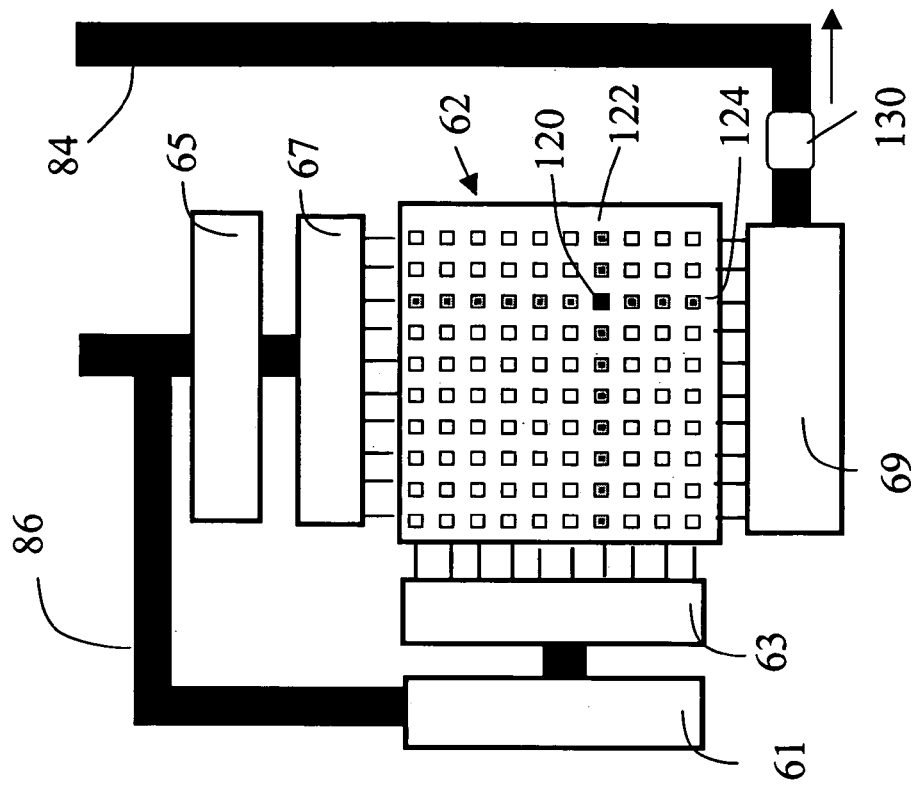
FIGS. 4(a)–(d) are a schematic depiction of a data read operation according to an exemplary embodiment of the present invention.
Figure 4A:
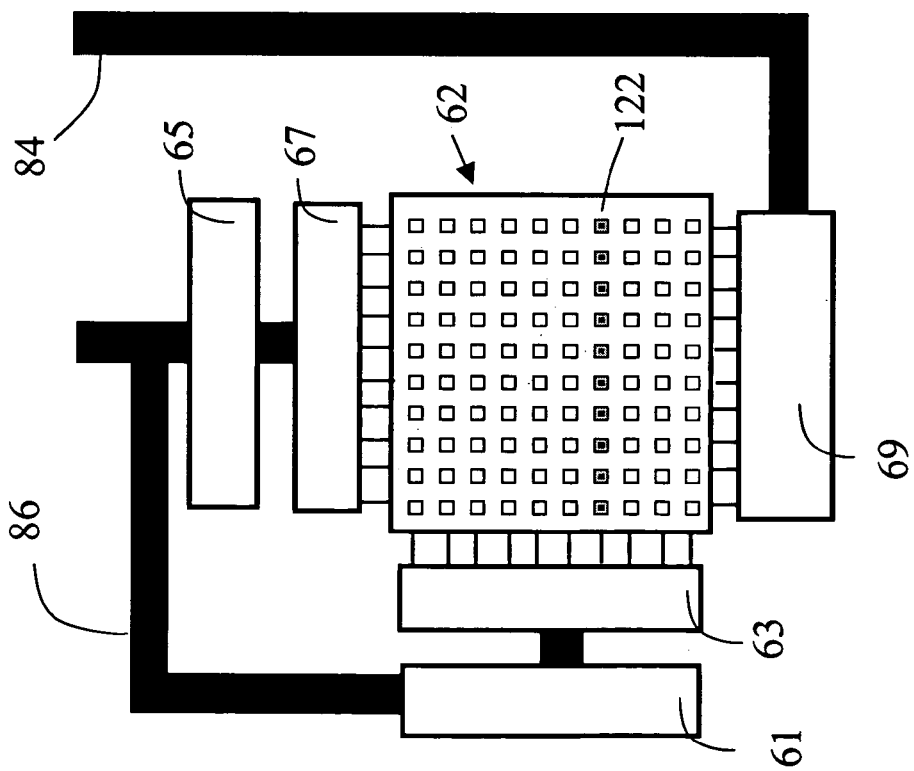
Figure 4D:
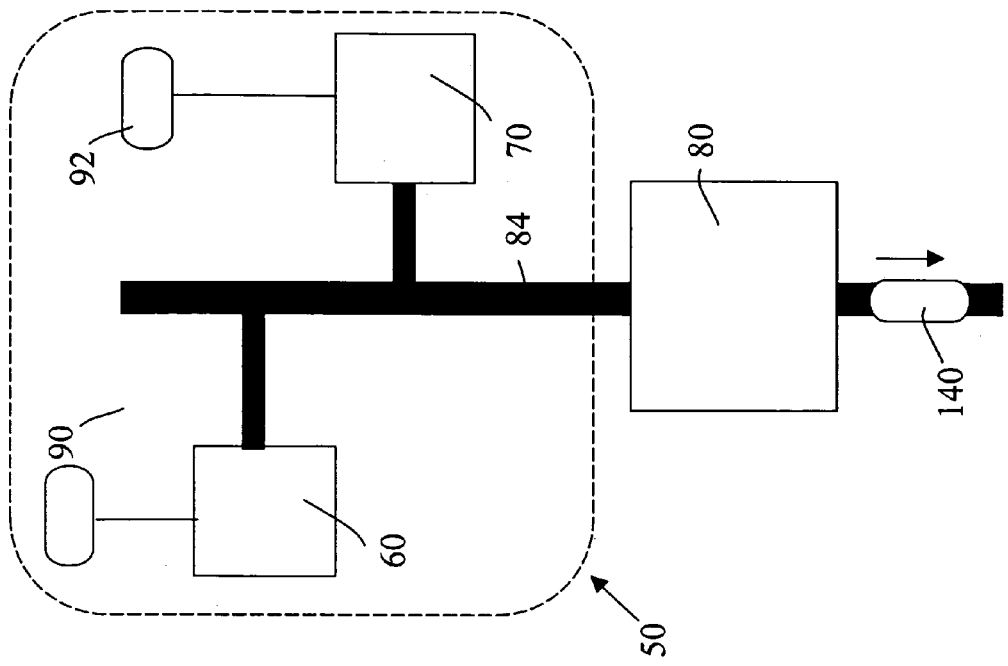
Figure 4C:
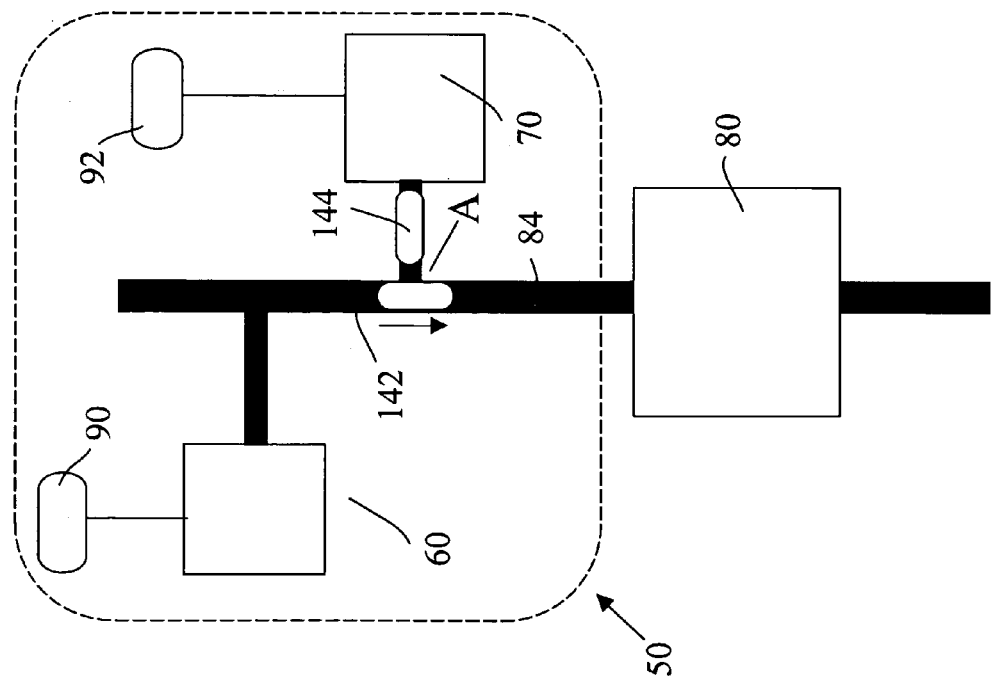

FIG. 3 illustrates steps employed in a data read operation using memory system 50, according to an exemplary embodiment of the present invention. In step 100, a processor sends a request to memory system 50, requesting a single byte 140 of data. Included in the message is address information locating the row and column position of the data. Controller 80 simultaneously sends a signal to arrays 60 and 70 to retrieve byte 140. However, array 70 receives the signal earlier than array 60 because of the closer proximity of array 70 to memory controller 80. In a preferred embodiment, byte 140 is stored in sub-portions, for example, as one bit in each of the sub-arrays 62, 64, 66, 68, 72, 74, 76, and 78. The bits are stored using a common address scheme. In other words, the row and column address for storing the individual bits comprising byte 140 is identical for each sub-array. FIGS. 4(a) and 4(b) illustrate a more detailed view of sub-array 62, representative of all the other sub-arrays. Address bus 86 is connected to row address latch 61 and column address latch 65. In step 102, a signal traveling along bus 86 places the bit row address on row address latch 61. It will be appreciated by those of ordinary skill in the art that step 102 in array 70 starts earlier than that in array 60, since array 70 is located near the memory controller 80. When step 102 is completed, a row address decoder 63 selects row 122 to be activated, as indicated in FIG. 4(a). In step 104, column 124 is activated through column address latch 65 and column address decoder 67, as illustrated in FIG. 4(b). This causes data from cell 120 to be read out. In step 106, data is output from array 60. Although array 60 initiates step 102 later than array 70, because of the higher Vdd, data bit output step 106 for array 60 occurs earlier than a similar step for array 70, data bit output step 108. This allows data packet 142 to be transferred to bus 84 earlier than the data packet 144 from the array 70 (FIG. 4(c)). However, because of a longer data path from array 60 to memory controller 80, the transit time of data from array 60 to memory controller 80 is somewhat longer than the transit time from array 70. Thus, for example, the arrival time of an output data packet 142 at controller 80 is determined by both the Vdd operating on array 60, and the distance between array 60 and controller 80. In a preferred embodiment, the arrival of packets 142 and 144 at controller 80 occur at about the same. For example, if it takes about six clock cycles to input packet 142 into controller 80, then preferably packet 144 arrives at controller 80 within six clock cycles of the arrival time of packet 142 at controller 80. In the above manner, in step 110, the combined data packets 142 and 144 are output without delay from controller 80 as byte 140, as illustrated in FIG. 4(d).

In the above example, although the access time for packet 144 from array 70 is longer than that of packet 142, the overall read time for byte 140 is the same as would be the case if the supply voltage to array 60 were identical to that used for array 50. This is due to the fact that the time required for packet 142 to travel along bus 84 past array 70 is sufficient for data access from array 70 to be completed, so that bits in packet 144 are output to bus 84 at point "A" at about the time that packet 142 is passing point "A". Because system 50 employs both array 70 operating at lower power (Vdd) than array 60, the total power consumed during the above-described read operation is less than that for a system comprising two identical arrays operating at the same voltage as array 60. The timing skew with respect to the data bits from different arrays is also reduced.

Figure 5A:
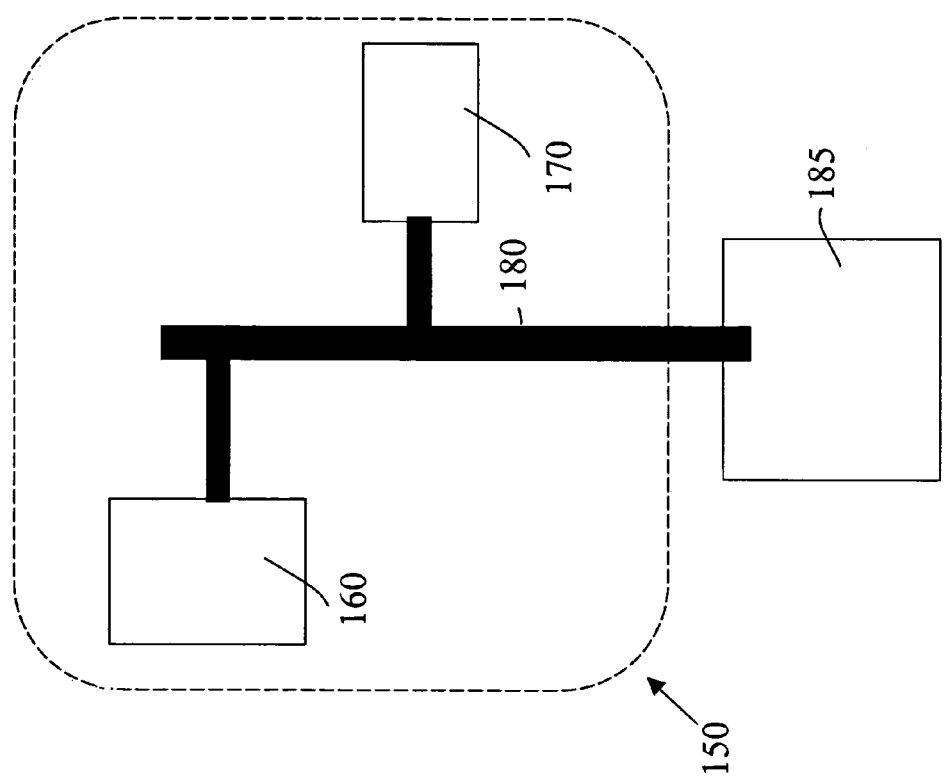
FIGS. 5(a)–(c) depict a memory system according to a further embodiment of the present invention, comprising arrays of differing wordline length.
Figure 5C:
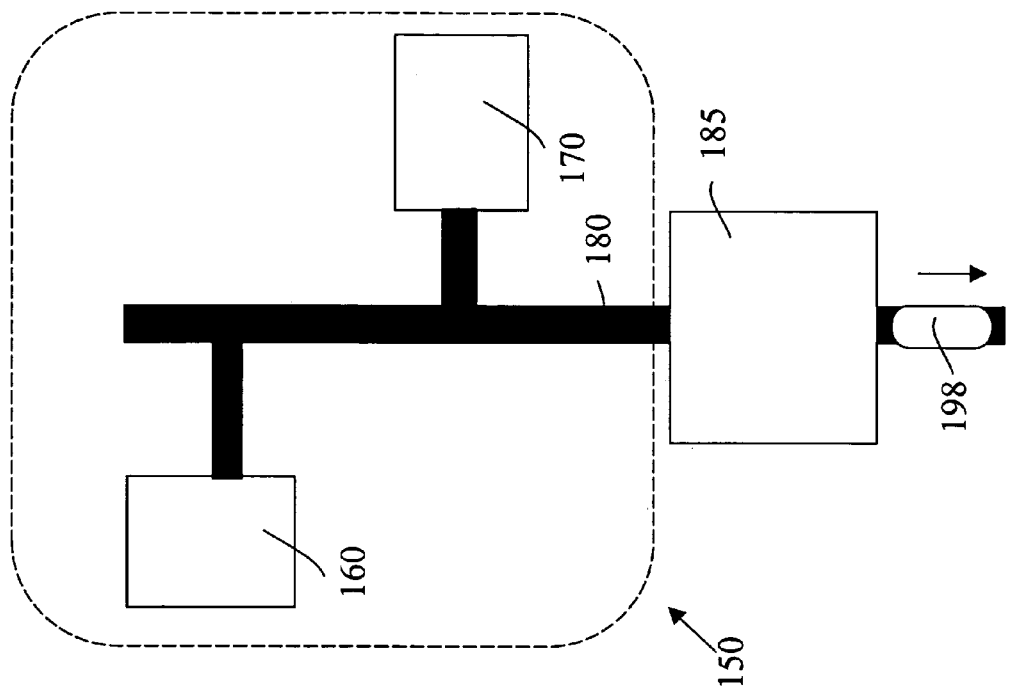
Figure 5B:
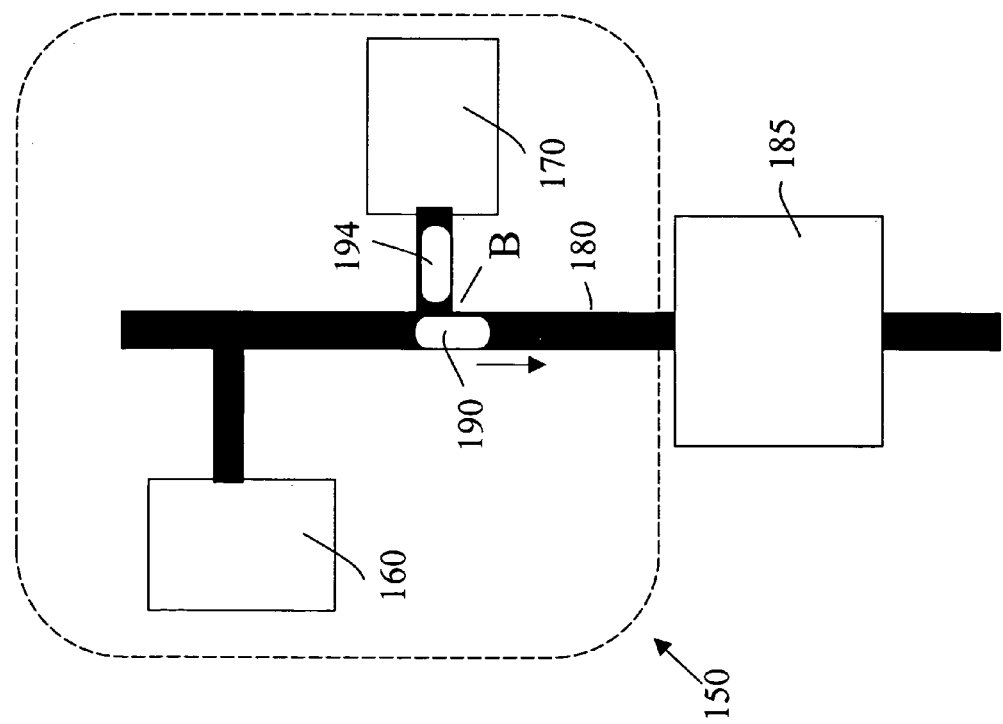
Figure 6:
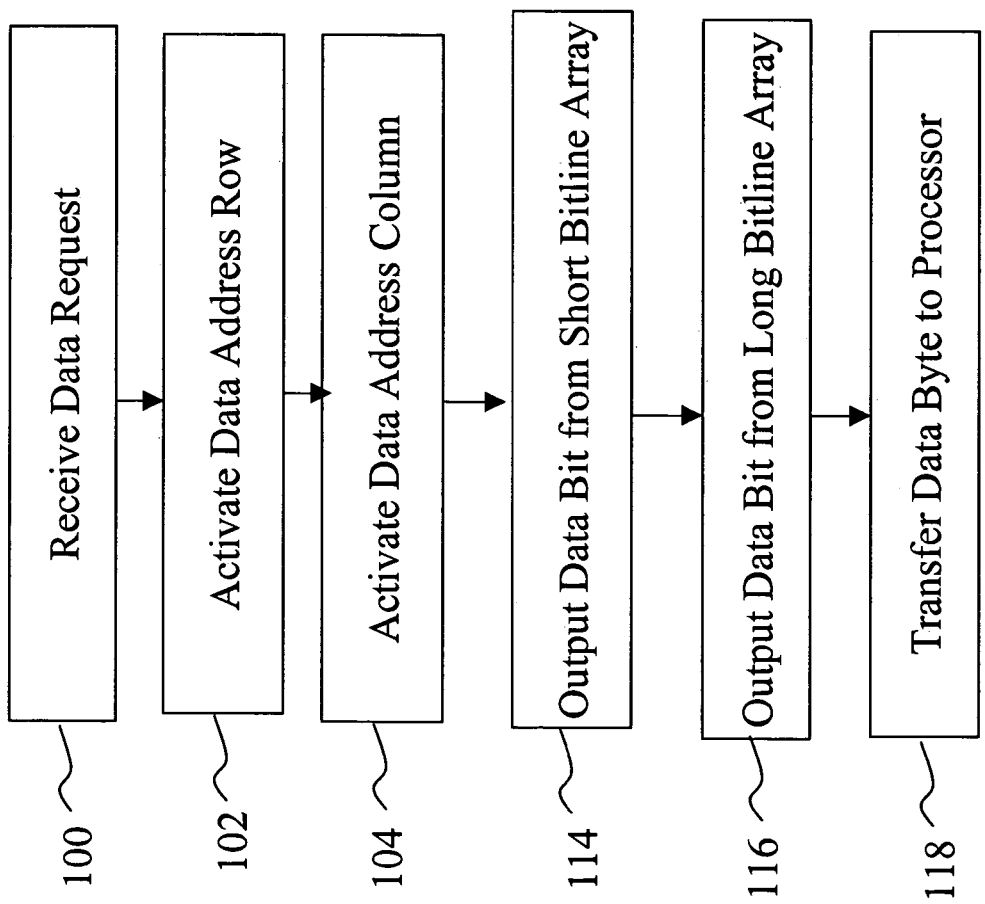
FIG. 6 depicts the steps comprising a data read operation according to further embodiment of the present invention.

In another embodiment of the present invention, illustrated in FIG. 5(a), a memory system 150 includes short wordline array 160 and long wordline array 170, in communication through bus 180 with controller 185. In a preferred embodiment, a long wordline array 170 is located near memory controller 185, while a short wordline array 160 is located further from controller 185. This allows array 170 to activate earlier than array 160. Arrays 160 and 170, may be further divided into four sub-arrays in a manner similar to that shown in FIG. 2. Because array 160 comprises shorter wordlines than array 170, the access time is less for array 160. FIG. 6 illustrates steps employed during a data read operation using system 150. The initial steps employed in a data read operation using memory system 150, are the same as those illustrated in FIG. 3 for system 50. In step 100, a request is sent to memory system 150, triggering row activation 102 and column activation 104 operations. In step 114, illustrated in FIG. 5(*b*), array 160 outputs four bit data packet 190. Similarly, in step 116, array 170 outputs four bit data packet 194. Combined data packets 190 and 194 are output by controller 185 as byte 198 in step 118, as illustrated in FIG. 5(*c*). Because array 170 comprises longer wordlines, the read access time is slower than that of array 160. However, data packet 190 output from array 160 must travel further to reach controller 185. In a preferred embodiment data packets 190 and 194 reach controller 185 at approximately the same time. Thus, referring to FIG. 5(*b*), in the time it takes for packet 190 to be placed on bus 180 and travel to point "B", data packet 194 is read out onto bus 180 at the same point. Furthermore, it is well known that long wordline array 170 requires less supporting architecture for a given array size than a short wordline architecture. Thus, the overall device area employed by system 150 is less than a comparable system employing two arrays both comprising the same short wordline structure as in array 160.

It will be apparent to those skilled in the art that the exemplary embodiments disclosed in FIGS. 4 and 5 can be combined to provide a memory system comprising two or more arrays in which both wordline length and Vdd vary between arrays. By judicious choice of wordline length, supply voltage, and array distance from a controller chip, the system properties can be optimized. In an exemplary embodiment, short wordline array 160 employs a lower Vdd operating voltage than the Vdd used for long wordline array 170, such that packets 190 and 194 arrive at controller 185 at about the same time.

Figure 7:
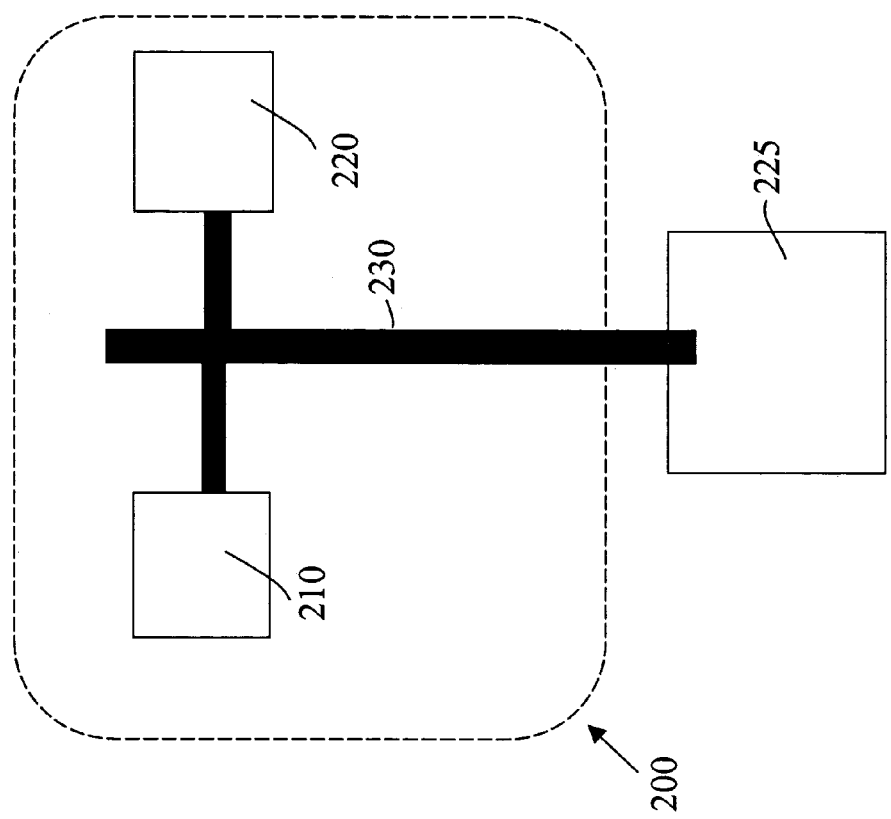
FIG. 7 depicts a memory system according to another embodiment of the present invention, comprising arrays of differing bitline sensing schemes.
Figure 8:
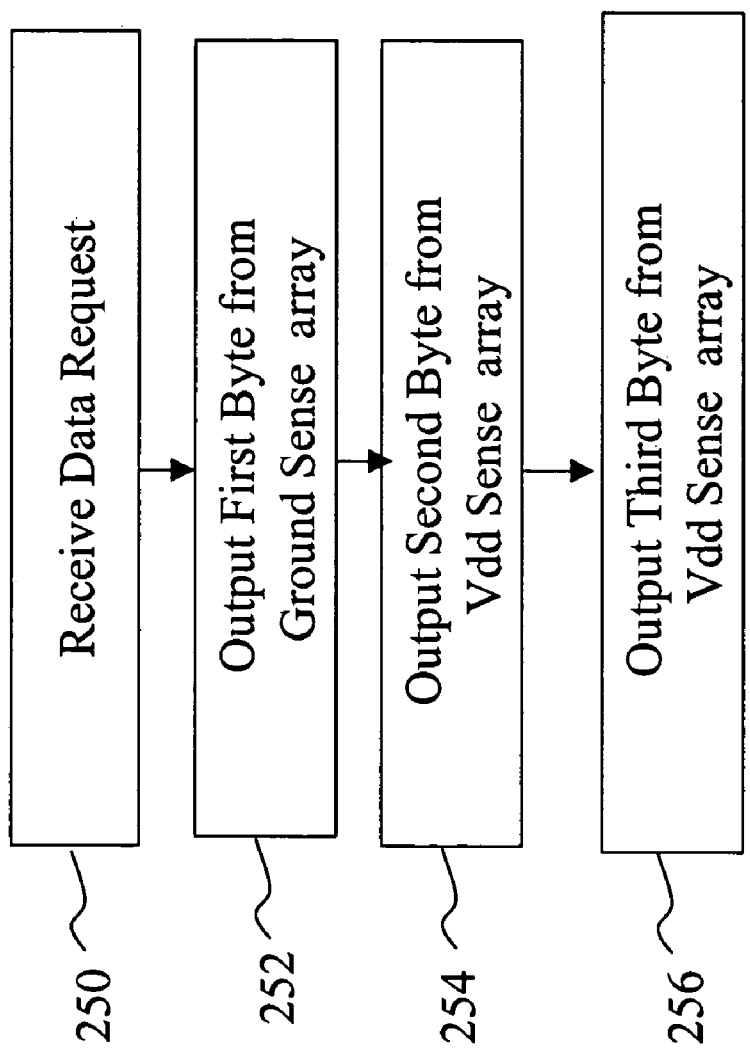
FIG. 8 depicts the steps comprising a data read operation according to another embodiment of the present invention.
Figure 9A:
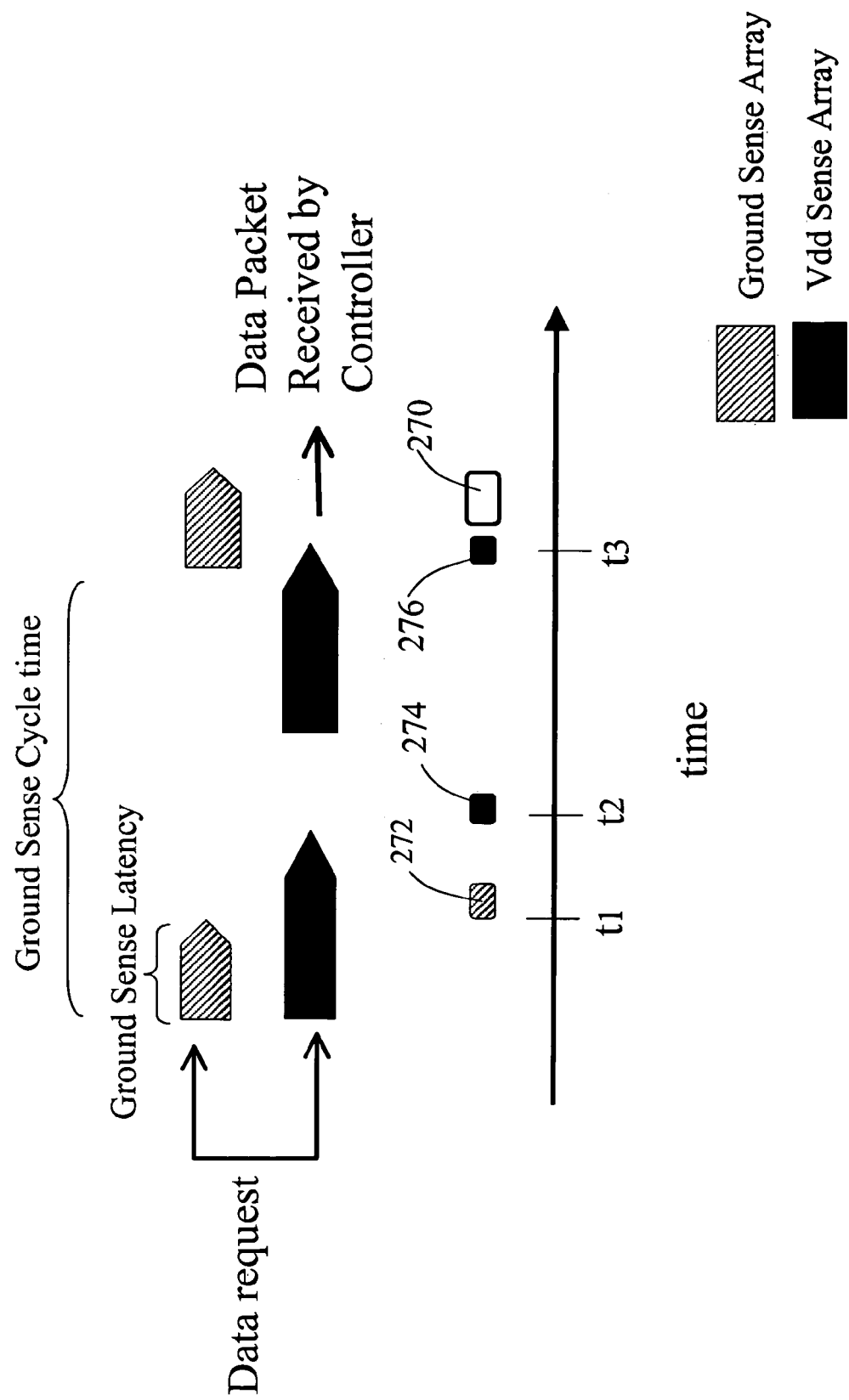
FIG. 9(a) illustrates the timing of multi-byte data read operations according to another embodiment of the present invention.
Figure 9B:
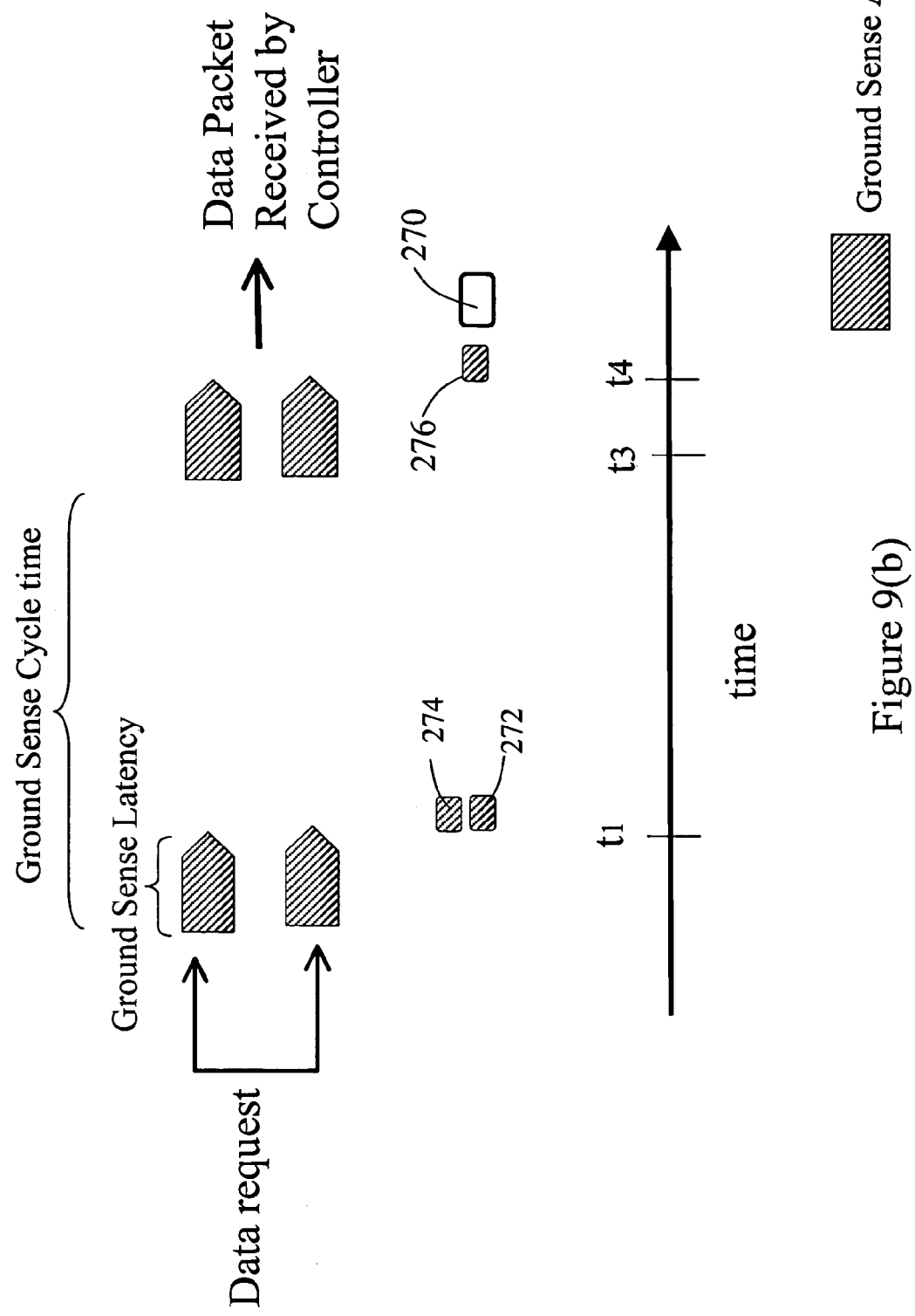
FIGS. 9(b) and 9(c) illustrate multi-byte data read operations according to the prior art.
Figure 9:
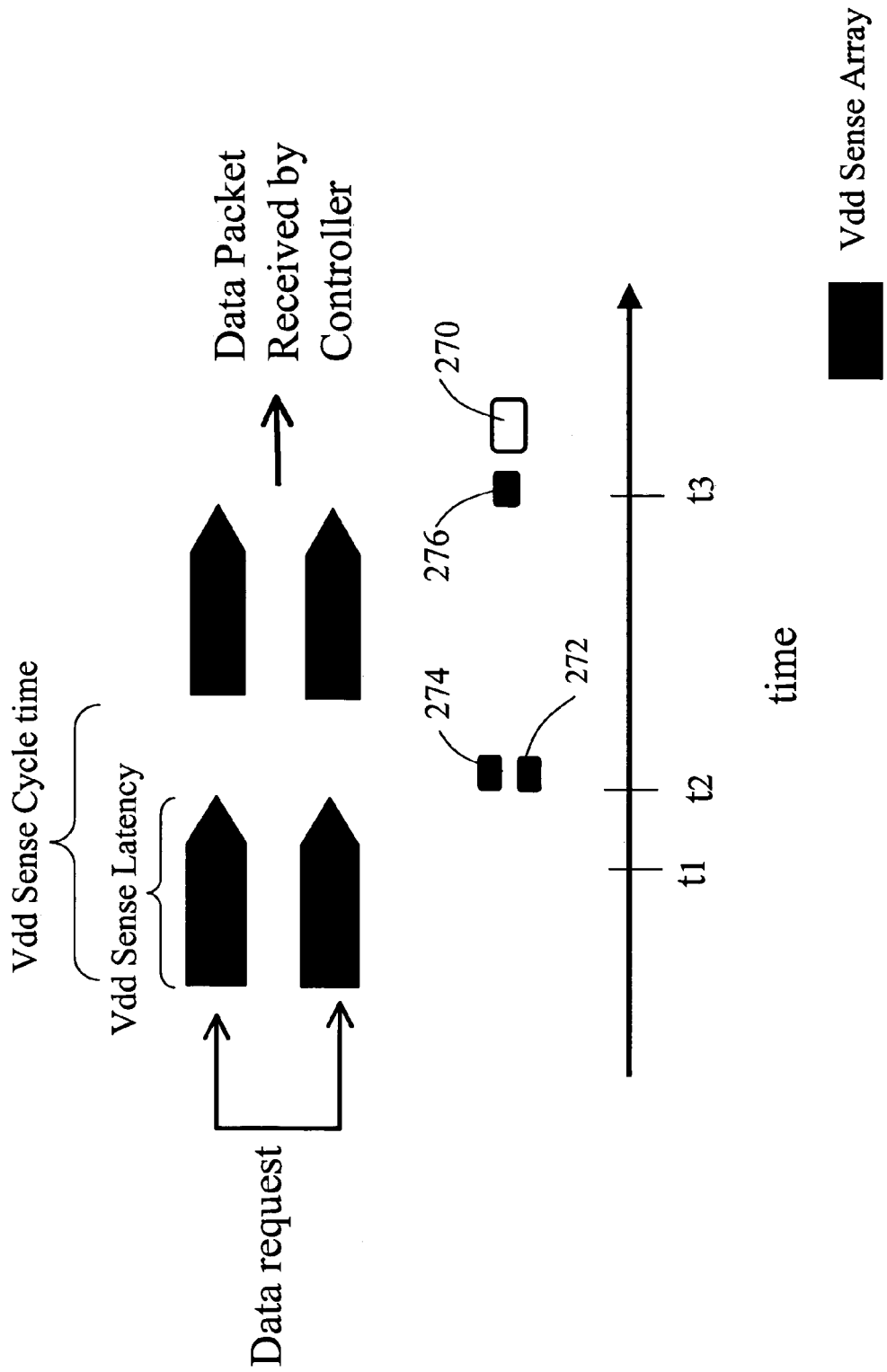

In another embodiment of the present invention, illustrated in FIG. 7, a memory system 200 comprises two arrays, including array 210 employing a Vdd sensing data read, and array 220, employing a ground sensing data read. Typically, a ground sensing scheme achieves a faster latency (access time) than a Vdd sensing scheme; however, use of a Vdd sensing scheme achieves a faster cycle time than a ground sensing scheme for an NMOS array. Unlike in the previously disclosed embodiments, the signal transit time to controller 225 from arrays 220 and 210 is about the same. Arrays 210 and 220 are connected to memory controller 225 through data bus 230, which may be a 1 byte data bus. It is also assumed that one byte of data can be obtained from either array 210 or 220 through data output bus 230. In array 220, because the presence of ground, rather than Vdd, is detected, the latency of the read operation is reduced with respect to array 210. However, by virtue of Vdd sensing detection, array 210 operates at a shorter cycle time between read operations than does array 220. In an exemplary embodiment of the present invention, outlined in FIG. 8, system 200 receives a request for a three byte information packet 270 at step 250. In step 252, a first byte is output from ground sensing array 220. In step 254, a second byte 274 is output from Vdd sensing array 210. Because of the shorter cycle time between read operations of array 210, in step 256 byte 276 is output from array 210. FIG. 9(*a*) illustrates the time sequence for output of data bytes from memory system 200. In the manner described above, byte 272 from array 220 is output at time t1, byte 274 from array 210 at time t2, and byte 276 from array 210 at time t3. This sequential transfer improves a bandwidth without increasing the width of data bus 230. The full data packet 270 comprising bytes 272, 274, and 276 is received by controller 225 by time t3.

FIG. 9(*b*) illustrates a memory system operating according to prior art, comprising two ground sensing arrays identical to array 220. Bytes 272 and 274 are output at time t1, simultaneously. This creates a data conflict on the 1 byte data bus 230. In addition, to complete the output of a three byte packet, one of the ground sense arrays must output an additional byte, 276, which does not take place until a time t4, greater than time t3. This results in slower bandwidth than that of the embodiment of the present invention disclosed in FIG. 9(*a*).

FIG. 9(*c*) illustrates a memory system operating according to the prior art with data stored in two Vdd sensing arrays. Data bytes 272 and 274 are output at time t2, simultaneously and byte 276 is output at time t3. This creates a data conflict on the 1 byte data bus 230. In addition, receiving of bytes 272 and 274 occurs later than time t1, resulting in a slower latency than that of the embodiment depicted in FIG. 9(*a*). It will therefore be recognized by one of ordinary skill in the art that the manner of output of data packet 270 disclosed in FIG. 9(*a*), represents a more efficient method of data retrieval than that illustrated in FIGS. 9(*b*) and (*c*). In FIG. 9(*a*), the output of bytes 272 and 274 is staggered, which can help avoid data bottlenecks that could occur when bytes 272 and 274 are output simultaneously, as is the case in FIGS. 9(*b*) and (*c*). Thus, by allocating portions of a data packet into a plurality of arrays, where the data sense scheme varies between arrays, the present invention facilitates more efficient data retrieval than the case where the data sense scheme does not vary between arrays.

Figure 10:
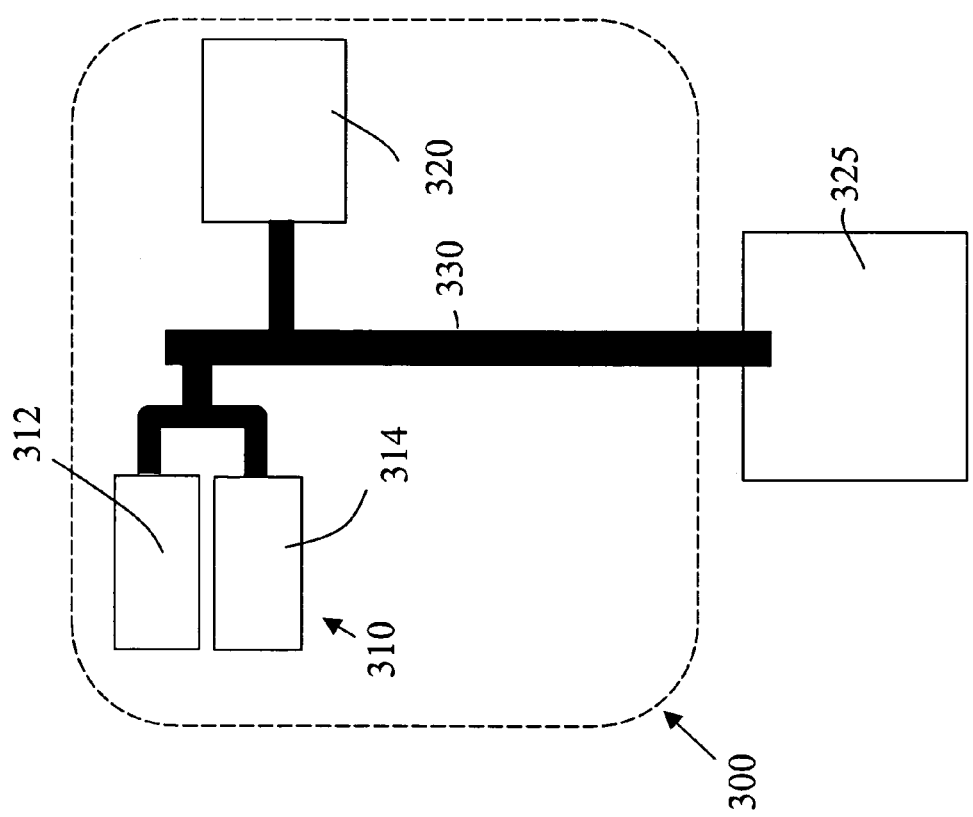
FIG. 10 depicts a memory system according to still another embodiment of the present invention, comprising arrays of differing bitline length.

A still further embodiment of the present invention, depicted in FIG. 10, comprises a system 300, including short bit line array 310, long bit line array 320, in communication with controller 325. In an exemplary embodiment, array 310 contains subarrays 312 and 314, each with 256 cells per bitline, and array 320, which contains 512 cells per bitline. Thus, both arrays 310 and 320 comprise a total of 512 wordlines. Because an individual bitline in array 320 contains more cells than a bitline in array 310, the bitline capacitance is larger, leading to a higher ratio of bitline to cell capacitance, and therefore a lower retention time of charge within a cell capacitor. Because of the lowered retention time, the refresh rate and therefore refresh current is greater in array 320 than in array 310. However, because array 310 includes support circuitry for each sub-array, 312 and 314, the total chip area used by array 310 is larger than that of array 320. When used in combination as illustrated in FIG. 10, system 300 receives the benefit of smaller chip size, and better memory availability. This is because the use of 512 cells per bitline reduces by half the requirement for sense amplifier banks compared to the requirement for 256 cells per bitline architecture. Although the retention requirement of the 512 cells per bitline is more than that for 256 cells per bitline, the average data retention requirement is less than the architecture employing only 512 cells per bitline.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the preformance of their steps in the order written, and one skilled in the art can readily appreciate that the sequences may be varied and still remain within the spirit and scope of the present invention.

What is claimed is:

1. A memory device comprising:
multiple memory arrays operating at differing operating voltages and/or utilizing differing sense amplifier architectures compensated for by their physical placement for the purpose of optimizing power efficiency and such that data comprising a single read and/or write transaction at a point in time consists of data respectively read from and/or respectively written to said multiple memory arrays.

2. The memory device of claim 1, and further comprising a memory controller connected to the memory arrays, wherein a first memory array operates at a first supply voltage and a second memory array operates at a second supply voltage, wherein the second supply voltage is less than the first supply voltage so that the first memory array performs read and write operations faster than said memory second array, and wherein a length of the signal path from the second memory array to said memory controller is less than a length of the signal path from the first memory array to the memory controller, such that, after a request for data, an output of a first data packet from the first memory array and an output of a second packet from the second memory array arrive at the memory controller at about the same time.

3. The memory device of claim 1, and further comprising a memory controller connected to the memory arrays, wherein the first memory array comprises a wordline length that is shorter than a wordline length of the second memory array, and wherein a length of the signal path from the second memory array to said memory controller is less than a length of the signal path from the first memory array to the memory controller, such that, after a request for data, an output of a first data packet from the first memory array and an output of a second data packet from the second memory array arrive at the memory controller at about the same time.

4. The memory device of claim 3, wherein the first memory array is connected to an operating voltage that is different than an operating voltage connected to the second memory array.

5. The memory device of claim 3, wherein the first memory array comprises sensing circuitry connected to and driven by a system supply voltage, and the second memory array comprises sensing circuitry connected to and driven by a ground potential such that the first memory array has a faster cycle time than the second memory array but the first array has a longer latency interval than the second memory array.

6. The memory device of claim 1, and further comprising a memory controller connected to the memory arrays, wherein each memory array stores a byte, and wherein the memory controller reads a multi-byte information packet from the memory arrays by reading bytes stored each of the respective memory arrays.

7. The memory device of claim 1, wherein one of the memory arrays has a refresh rate and refresh current that is greater than a refresh rate and refresh current for another of the memory arrays.

8. The memory device of claim 1, wherein a first memory comprises more cells per bitline than the number of cells per bitline of a second memory array.

9. The memory device of claim 8, wherein the second memory array comprises at least two sub-arrays each having the same number of cells per bitline.

* * * * *